June 9, 1964     O. W. RIDEOUT     3,136,828

LIQUID DISTRIBUTION MEANS

Filed Dec. 22, 1960     2 Sheets-Sheet 1

OWEN W. RIDEOUT
INVENTOR.

BY Ernest G. Peterson
AGENT

June 9, 1964   O. W. RIDEOUT   3,136,828
LIQUID DISTRIBUTION MEANS

Filed Dec. 22, 1960   2 Sheets-Sheet 2

OWEN W. RIDEOUT
INVENTOR.

BY   Ernest G. Peterson
AGENT.

United States Patent Office 3,136,828
Patented June 9, 1964

3,136,828
LIQUID DISTRIBUTION MEANS
Owen W. Rideout, Wilmington, Del., assignor to Hercules Powder Company, Wilmington, Del., a corporation of Delaware
Filed Dec. 22, 1960, Ser. No. 77,556
5 Claims. (Cl. 261—98)

This invention relates to improvements in apparatus for distributing liquid and, more particularly, in apparatus of this type designed for uniformly distributing liquid over the packing in a packed column.

It is recognized that efficient performance of a packed column is dependent upon uniform irrigation of the packing. The usual method of accomplishing uniform irrigation is by use of distributor plates of varying designs but all characterized by a multiplicity of holes, weirs, or other means for separating the reflux or feed liquid into a number of smaller streams. This method becomes impractical as the quantity of liquid per unit of tower cross section area is reduced. This is particularly serious in distillation where the liquid rate is quite small as compared to absorption or stripping operations. With small liquid flows it becomes necessary either to space the points of application of the liquid very widely apart thus sacrificing efficiency, or to provide a larger number of very small orifices or weirs which are subject to plugging.

An important object of the invention is the provision of an improved apparatus for distributing liquids in which the disadvantages of prior art apparatus and particularly the tendency to plugging are eliminated or substantially reduced.

Another object of the invention is the provision of improved liquid distribution apparatus which will uniformly irrigate the packing in a packed column.

Another object of the invention is to accomplish the foregoing objects economically and efficiently.

In accordance with the invention, the above and other objects are accomplished by the provision of a distributor comprising a container or cup positioned at or adjacent the center of the column from which one or more hollow arms provided with spaced holes extend outwardly and upwardly to points adjacent the wall of the column. The hollow arms are so disposed and the openings therein so spaced and sized that, when the assembly is rotated around the center of the column, and liquid is supplied to the centrally located cup, each unit of the column cross section will receive the same amount of liquid.

Having described the invention generally, the details thereof will now be described in connection with the accompanying drawings wherein.

Figure 1:
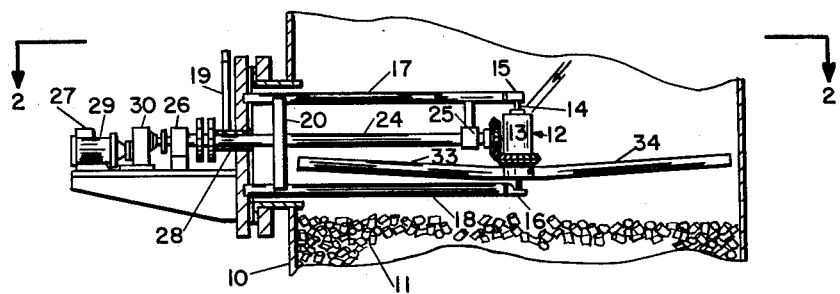
FIG. 1 is a vertical sectional view of a portion of a packed column taken substantially along the line 1—1 of FIG. 2.
Figure 2:
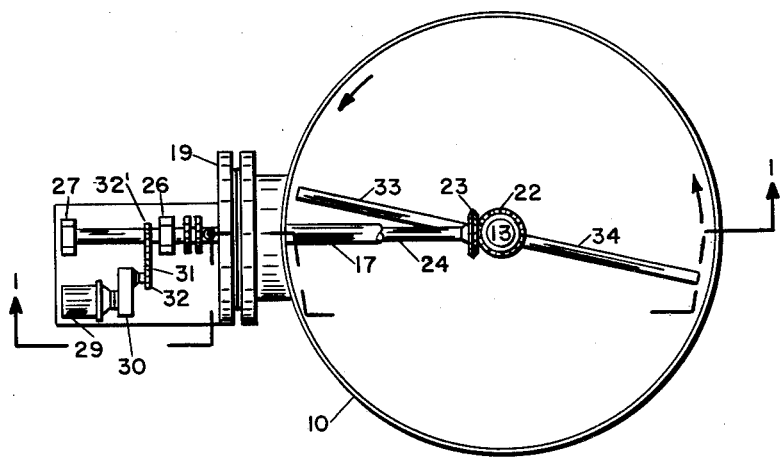
FIG. 2 is a horizontal sectional view taken on the line 2—2 of FIG. 1.
Figure 3:
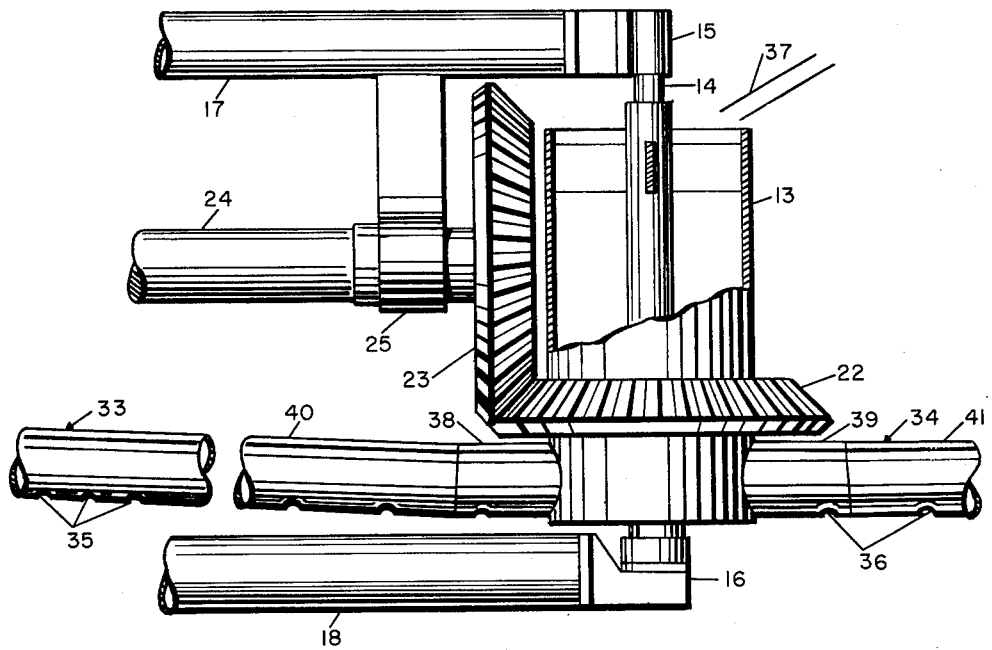
FIG. 3 is an enlarged fragmentary view, partly in section, of a portion of the distributor, viewed as in FIG. 1.

Referring to FIGS. 1-3, the numeral 10 designates a packed column containing packing 11. The packing 11 may be any suitable type such as rings, saddles, or the like.

Arranged above the packing 11 is the novel liquid distributing apparatus 12 of the invention which comprises a cup or container 13 positioned at the center of the column 10 and carried by a shaft 14 rotatably mounted in bearings 15 and 16. The bearings 15 and 16, in turn, are carried by arms 17 and 18 secured to a flange 19 and suitably reinforced by one or more connecting members 20.

Means for rotating the cup 13 comprise a bevel gear 22 mounted on the cup 13 and a cooperating bevel gear 23 mounted on shaft 24. The shaft 24 is rotatably supported in bearings 25, 26 and 27 and extends outwardly through the stuffing box 28 and flange 19 where it is rotatably driven by a motor 29 in any suitable manner, as through a reduction gear 30 and chain 31 connecting sprockets 32 and 32′.

The cup 13 carries one or more, and preferably two, hollow arms 33 and 34 (FIG. 3) extending outwardly therefrom and provided with spaced openings or holes 35 and 36. Liquid from the cup 13 passes into the hollow arms 33 and 34 and outwardly through the holes 35 and 36. Liquid may be fed into the cup 13 at a controlled rate through pipe 37.

The holes 35 and 36 are preferably arranged so that liquid drops on a number of concentric circles spaced from the center to the wall of the column. It is preferred that the maximum spacing of the concentric circles not exceed about six inches. The amount flowing per unit of time along any given circle should be proportional to the radius of the circle in order to achieve uniform irrigation. This graduation of flow is achieved by suitably sizing the holes so that the total hole area in square inches on any given concentric circle will be given by the value of "$a$" as determined by the following equation:

$$(1) \qquad a = \frac{.0345\, rdW}{CPR^2\sqrt{h}}$$

where $r$ is the radius in inches of the circle traced by a particular hole or holes, $d$ is the space in inches between concentric circles, $W$ is the pounds/hour of liquid to be distributed, $C$ is the orifice constant for the hole, and is approximately equal to 0.61 (see Cameron Hydraulic Data, Eleventh Edition, published by Ingersol Rand Company, page 68), $P$ is the density in pounds/cubic foot of liquid, $R$ is the radius in inches in the column, and $h$ is the head over the orifice in inches of the liquid flowing. As will be evident, the holes 35 and 36 increase in size as their distance from the axis of rotation increases.

It is also important that uniformity of irrigation be maintained at different total flow rates. In the case of a distributor rotating very slowly, this is simply attained by making the central cup of sufficient height so that the head of liquid over the holes will automatically accommodate itself to the total flow requirement. However, unless the tower is of small diameter, a rotational speed of more than about 5 revolutions per minute will exert a centrifugal force on the liquid in the arms which will appreciably increase the liquid head on the outer holes over that impressed on the inner holes. Because the centrifugal force is only dependent on radial distance and rotating speed, it will not increase as rate of total flow increases, and unless some provision is made, uniform irrigation will not be maintained at different rates of flow.

In accordance with the present invention, the necessary compensation for the effective centrifugal force is obtained by extending the arms 33 and 34 upwardly from or adjacent to their connection with said cup toward their ends, the degree or extent to which the arms extend upwardly being such that the rise above horizontal at any radius is equal to the centrifugal force at that radius. The required height above horizontal at any particular radius may be computed from the following equation:

$$(2) \qquad H = \frac{S^2 r^2}{70{,}400}$$

where H is the rise in inches of a particular hole above the horizontal, S is the rotational speed in revolutions/minute of the distributor, and r is the radius in inches of the circle traced by the hole.

In the embodiment of the invention shown in FIGS. 1–3 the arms 33 and 34 comprise relatively short horizontally disposed portions 38 and 39 connected at their inner ends to the cup 13 and at their outer ends to upwardly inclined straight portions 40 and 41.

Figure 4:
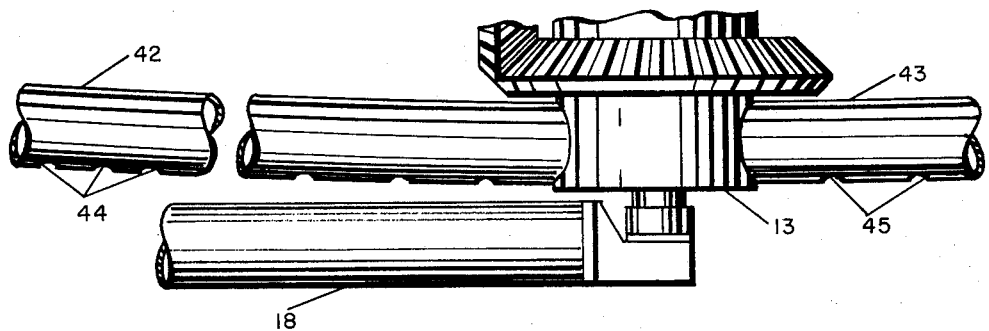
FIG. 4 is a view similar to FIG. 3, but with portions omitted, showing a modified form of apparatus.

In the modified form of the apparatus shown in FIG. 4 the arms 42 and 43, which correspond to the arms 33 and 34 of FIG. 3, are shown as curving upwardly as they extend outwardly from their connections with the cup 13. The arms 42 and 43 are provided with openings or holes 44 and 45 through which liquid is discharged onto the packing 11. The sizes of the holes 44 and 45 and their heights above horizontal are determined in the same manner as the sizes and heights above horizontal of the holes 35 and 36. It will be apparent, of course, that the calculated heights above horizontal for the openings 35, 36, 44 and 45 determine the degree of upward slope or curvature of the arms 33, 34, 42 and 43.

Figure 5:
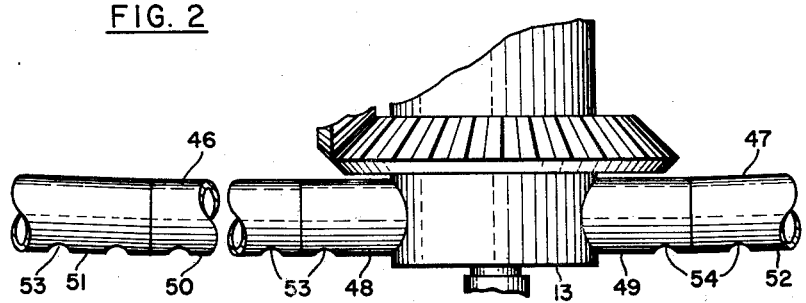
FIG. 5 is a view similar to FIG. 3, but with portions omitted, showing a further modified form of apparatus.

In the further modified form of the apparatus shown in FIG. 5, the arms 46 and 47 are composed of horizontally disposed portions 48 and 49 and upwardly inclined straight sections 50, 51 and 52. The arms 46 and 47 are provided with openings or holes 53 and 54.

In the operation of the apparatus, liquid is fed into the cup 13 at a desired rate and is discharged from the openings 34 and 35, 44 and 45 or 53 and 54 onto the packing in concentric circles. The speed of rotation of the arms, while not critical, should not be less than about 5 revolutions per minute while speeds in the range of 10–20 revolutions per minute are preferred for columns of commercial size.

In constructing the apparatus, it is not necessary to slope or curve the arms 33 and 34, 42 and 43 or 46 and 47 in strict accordance with the values of H. Thus, deviations from a perfect curve of about 10% of the operating liquid head at minimum flow can be tolerated in some cases without unduly adversely affecting the uniformity of distribution. In general, it will be possible to approximate the desired curve of the arms by using one or more uniformly sloped sections as previously indicated herein.

The diameter of the cup or container 13 is not critical although it must be large enough to receive flow from an inlet pipe.

While a preferred embodiment of the invention has been shown, the invention is not intended to be limited to the details specifically illustrated and described except as they may be included in the following claims.

What I claim and desire to protect by Letters Patent is:

1. In a packed column having a packed section, means for uniformly distributing liquid over said packed section comprising a cup positioned centrally of the column, means for supplying liquid to said cup, means mounting the cup for rotation about the vertical axis of the column, hollow arms secured to the cup for rotation therewith and extending outwardly therefrom over the packing, said hollow arms communicating with said cup for receiving liquid therefrom and having a plurality of spaced holes for discharging such liquid onto said packing in concentric circles about the vertical axis of the column as said cup and arm are rotated, the total hole area in square inches at any particular radius being approximately equal to the value of "$a$" in the following formula:

$$a = \frac{.0345\, rdW}{CPR^2\sqrt{h}}$$

where $r$ is the radius in inches of a circle traced by a particular hole about said axis, $d$ is the space in inches between said concentric circles, W is the lbs./hour of liquid to be distributed, C is the orifice constant for the hole and is approximately equal to 0.61, P is the density in lbs./cu. ft. of liquid, R is the radius in inches of the column, and $h$ is the head over the orifice in inches of the liquid flowing, said arms extending upwardly from adjacent said cup to their outer ends, the degree at which said arms extend upwardly being such that the height in inches of a particular hole above horizontal is approximately equal to the value of "H" in the following formula:

$$H = \frac{S^2 r^2}{70,400}$$

where H is the height in inches of said particular hole above the horizontal, S is the rotational speed in revolutions/minute of the distributor and $r$ is the radius in inches of the circle traced by said particular hole.

2. Apparatus in accordance with claim 1 in which each of said arms includes at least one straight section.

3. Apparatus in accordance with claim 1 in which each of said arms includes a plurality of interconnected upwardly sloping straight sections.

4. Apparatus in accordance with claim 1 in which each of said arms includes a curved section.

5. Apparatus in accordance with claim 1 in which each of said arms curves upwardly as it extends outwardly from said cup.

References Cited in the file of this patent

UNITED STATES PATENTS

| | | |
|---|---|---|
| 1,847,763 | Keys | Mar. 1, 1932 |
| 2,797,429 | Jensen et al. | July 2, 1957 |
| 2,859,064 | Nelson | Nov. 4, 1958 |
| 2,919,861 | Meek | Jan. 5, 1960 |
| 2,988,287 | Sherman | June 13, 1961 |

FOREIGN PATENTS

| | | |
|---|---|---|
| 726,151 | Great Britain | Mar. 16, 1955 |